United States Patent
Keller (10) Patent No.: US 10,070,630 B2
(45) Date of Patent: Sep. 11, 2018

(54) OVERFLOW BOX AND FILTER SYSTEM FOR AN AQUARIUM

(71) Applicant: Adam John Keller, Fremont, WI (US)

(72) Inventor: Adam John Keller, Fremont, WI (US)

(*) Notice: Subject to any disclaimer, the term of this patent is extended or adjusted under 35 U.S.C. 154(b) by 114 days.

(21) Appl. No.: 15/392,172

(22) Filed: Dec. 28, 2016

(65) Prior Publication Data

US 2018/0177163 A1     Jun. 28, 2018

(51) Int. Cl.
| | |
|---|---|
| *A01K 63/04* | (2006.01) |
| *B01D 29/90* | (2006.01) |
| *C02F 1/00* | (2006.01) |
| *A01K 63/00* | (2017.01) |
| *C02F 103/20* | (2006.01) |

(52) U.S. Cl.
CPC .......... *A01K 63/045* (2013.01); *A01K 63/003* (2013.01); *B01D 29/90* (2013.01); *C02F 1/001* (2013.01); *C02F 2103/20* (2013.01); *C02F 2307/00* (2013.01)

(58) Field of Classification Search
CPC .... A01K 63/047; A01K 63/045; A01K 63/04; A01K 63/00; A01K 63/006; A01K 63/003
USPC ....... 119/245, 246, 247, 259, 269, 248, 251, 119/252, 253; 137/571, 575, 577, 577.5; 210/416.2, 167.21, 167.27
See application file for complete search history.

(56) References Cited

U.S. PATENT DOCUMENTS

| | | | | |
|---|---|---|---|---|
| 4,684,462 A | * | 8/1987 | Augustyniak | A01K 63/045 119/260 |
| 4,988,436 A | * | 1/1991 | Cole | A01K 63/04 119/260 |
| 5,160,622 A | * | 11/1992 | Gunderson | A01K 63/045 210/167.22 |
| 5,172,650 A | * | 12/1992 | Hsu | A01K 63/045 119/259 |

(Continued)

FOREIGN PATENT DOCUMENTS

CN           202400501         8/2012

OTHER PUBLICATIONS

Wpeterson et al., 40gal Humble Reef, discussion thread, http://www.reef2reef.com/threads/40gal-humble-reef.250942/, printed Oct. 13, 2016, 11 pages.

(Continued)

*Primary Examiner* — Trinh T Nguyen
(74) *Attorney, Agent, or Firm* — Thomas J. Connelly; Northwind IP Law, S.C.

(57) ABSTRACT

An overflow box and a filter system for an aquarium are disclosed which quiets the removal of waste water from an aquarium. The aquarium has a bottom wall, a sidewall, a first aperture formed through the sidewall, and a peripheral rim. The overflow box has a bottom wall, a front wall, a back wall and two sidewalls. The front wall has a first opening formed therethrough which is coaxially aligned with the first aperture formed in the sidewall of the aquarium. The bottom wall of the overflow box has a plurality of slip fittings formed therein. The plurality of slip fittings are of at least three (Continued)

different sizes. One of the slip fittings is open to water flow while the remaining slip fittings are initially closed to water flow by a thin wall. The overflow box also has an open top.

20 Claims, 6 Drawing Sheets

(56) References Cited

U.S. PATENT DOCUMENTS

| | | | | |
|---|---|---|---|---|
| 5,306,421 | A * | 4/1994 | Weinstein | A01K 63/045 119/248 |
| 5,626,747 | A * | 5/1997 | Ritzow | A01K 63/045 119/259 |
| 5,901,663 | A | 5/1999 | Reinke | |
| 5,965,016 | A * | 10/1999 | Suchowski | A01K 63/045 119/260 |
| 6,056,886 | A * | 5/2000 | Hickok, Jr. | A01K 63/04 119/259 |
| 6,299,765 | B1 * | 10/2001 | Fabrizio | A01K 63/045 119/259 |
| 8,132,534 | B2 * | 3/2012 | Arita | A01K 63/006 119/259 |
| 9,409,804 | B1 | 8/2016 | Keller | |
| 9,585,372 | B2 * | 3/2017 | Keller | A01K 63/006 |
| 2009/0250121 | A1 * | 10/2009 | Kirkman | A01K 63/006 137/386 |
| 2016/0227748 | A1 | 8/2016 | Keller | |

OTHER PUBLICATIONS

Hifidelity et al., External silent overflow in 50G tank, discussion thread, http://www.reefcentral.com/forums/showthread.php?t=2459245, printed Oct. 13, 2016, 5 pages.

Plnelson et al., Thread: System build, discussion thread, http://www.tcmas.org/v4/forums/showthread.php?26392-System-build, printed Oct. 13, 2016, 16 pages.

The Juggernaut et al., Custom Overflow Box, discussion thread, http://www.reef2reef.com/threads/custom-overflow-box.198149/, printed Oct. 13, 2016, 8 pages.

Dennis Glaze, Aquarium Science—Water Flow Management, YouTube Video, https://www.youtube.com/watch?v=IHQPBV4SYBW, May 5, 2011, Oregon, relevant information: 0:45 min-2:26 min.

Bulk Reef Supply.com, How To: Installing an internal aquarium overflow and drilling holes in glass aquariums, YouTube Video, https://www.youtube.com/watch?v=87yJbAW32hQ, May 15, 2012, relevant information: 3:15 min.

\* cited by examiner

OVERFLOW BOX AND FILTER SYSTEM FOR AN AQUARIUM

FIELD OF THE INVENTION

This invention relates to an overflow box and filter system for an aquarium.

BACKGROUND OF THE INVENTION

Aquariums are water filled enclosures in which living fish and/or other aquatic animals and plants are kept. Aquariums have been popular for keeping and displaying fresh water and saltwater fish. The environment in an aquarium must be constantly maintained to assure the water quality is clean and free from waste material. Waste material is generated by the fish and by the natural decomposition by bacteria of plant, animal tissue and food. Some waste material can result from foreign contamination of the aquatic environment. This task is even more important with saltwater environments, which must maintain many delicate balances including pH and salinity.

Filtration systems are normally employed to remove waste water from the aquarium, filter out contaminates, and then and re-circulate the clean water back into the aquarium. Many different filtration systems are available today. It has been found that the owners of many home aquariums desire a filtration system that is quiet and which does not generate a gurgling sound. Noisy filter systems just are not tolerated. In addition, many owners of aquariums prefer an external filtration system rather than an internal filter system, which is located at the bottom or at a corner of the aquarium. Internal filter systems tend to be cumbersome in construction, harder to maintain and clean, and some internal filters detract from the aesthetic appearance of the internal environment of the aquarium. Furthermore, many aquarium owners do not want a drain tube to extend over the upper perimeter of the aquarium for it is unsightly.

External overflow boxes are presently being used which mount to the back wall or a sidewall of an aquarium. The overflow box functions as a temporary reservoir for waste water that has been removed from the aquarium. However, most overflow boxes either employ a drain tube which extends over the upper perimeter of the aquarium or they employ an opening drilled through the back wall which is aligned with the surface water line in the aquarium. This first kind of overflow boxes appear unsightly and are shunned by many aquarium owners. The second kind of overflow boxes tend to be noisy and produce a gurgling sound as waste water is removed from the surface of the aquarium.

Now an overflow box and filter system for an aquarium have been invented which solves the above noise and aesthetic problems, while allowing the inside of the aquarium to remain uncluttered and present a pleasant aesthetic appearance.

SUMMARY OF THE INVENTION

Briefly, this invention relates to an overflow box and filter system for an aquarium. The overflow box is positioned externally to and is secured to an aquarium. The aquarium has a bottom wall, at least one sidewall extending upward from the bottom wall, a first aperture formed through the at least one sidewall, and a peripheral rim. The aquarium is capable of holding a quantity of water. The overflow box includes a bottom wall, a front wall, a back wall and two sidewalls secured together. The front wall has a first opening formed therethrough and the front wall is configured to contact the sidewall of the aquarium having the first aperture formed therethrough. The first opening and the first aperture are coaxially aligned. The bottom wall of the overflow box has a plurality of slip fittings formed therein. Each of the slip fittings includes a first hollow ring extending upward from the bottom wall into the overflow box and a second hollow ring extending downward from the bottom wall away from the overflow box. The plurality of slip fittings are of at least three different sizes. One of the slip fittings is open to water flow while the remaining slip fittings are initially closed to water flow by a thin wall. The overflow box also has an open top which can be closed by a cover. The overflow box receives waste water from below the surface water line of the aquarium, and directs the waste water to an external filter. Clean water from the external filter is then returned to the aquarium.

A filter system for an aquarium is also taught. The aquarium has a bottom wall and at least one sidewall extending upward from the bottom wall, a first aperture formed through the at least one sidewall, and a peripheral rim. The aquarium is capable of holding a quantity of water and has a surface water line. The filter system includes an overflow box having a bottom wall, a front wall, a back wall and two sidewalls secured together. The front wall has a first opening formed therethrough and the front wall is configured to externally contact the sidewall of the aquarium having the first aperture formed therethrough. The first opening and the first aperture are coaxially aligned. The bottom wall of the overflow box has a plurality of slip fittings formed therein. The slip fittings are of at least three different sizes. One of the slip fittings is open to water flow while the remaining slip fittings are initially closed to water flow by a thin wall. The overflow box also has an open top which can be closed by a cover. The filter system also includes a connecting tube having a first end and a second end. The first end is secured to an overflow device positioned at the surface water line in the aquarium. The overflow device removes waste water from the aquarium. The second end of the connecting tube connected to a coupler which is secured to the overflow box. The coupler passes through the first aperture formed through the sidewall of the aquarium and passes through the first opening formed in the overflow box. The connecting tube routes the waste water from the aquarium to the overflow box. The open top of the overflow box is aligned flush with the peripheral rim of the aquarium when the coupling is secured by a nut. The filter system further includes a drain tube which has a first end connected to the slip fitting, which is open to water flow, and a second end connected to an external filter. The external filter is capable of filtering the waste water to produce clean water. A pump associated with the external filter then returns the clean water through a return line back into the aquarium.

The general object of this invention is to provide an overflow box and filter system for an aquarium. A more specific object of this invention is to provide an external over flow box and filter system for an aquarium which is very quiet and easy to maintain.

Another object of this invention is to provide an overflow box which is fluidly connected to the aquarium through a first aperture formed in the back wall or sidewall of an aquarium and which permits the first aperture to be aligned below the water line in the overflow box.

A further object of this invention is to provide an overflow box wherein its open top can be aligned flush with the peripheral rim of an aquarium.

Still another object of this invention is to provide an overflow box which has no moving parts and is an integral member.

Still further, an object of this invention is to provide a filter system for an aquarium which is very quiet, reduces water evaporation, and is easy to maintain.

Other objects and advantages of the present invention will become more apparent to those skilled in the art in view of the following description and the accompanying drawings.

DETAILED DESCRIPTION OF THE INVENTION

Figure 1:
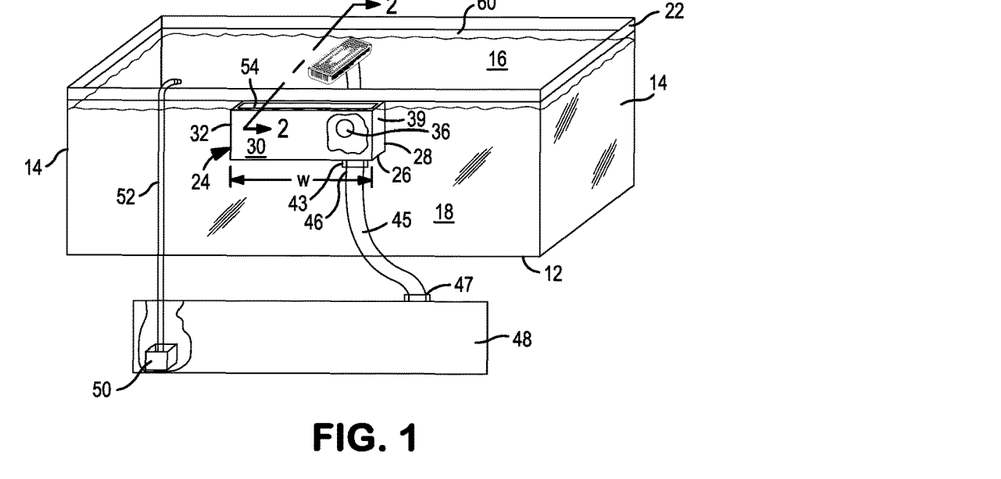
FIG. 1 is a rear perspective view of the filter system as it is attached to the aquarium, and shows the overflow device in the aquarium, an external overflow box, a drain tube, an external filter, a pump and a return line.
Figure 2:
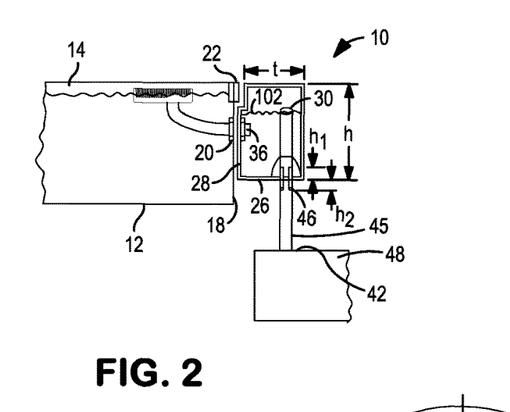
FIG. 2 is a side view of FIG. 1 taken along line 2-2.
Figure 3:
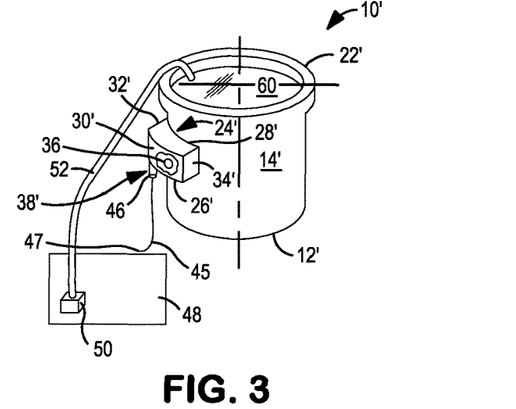
FIG. 3 is a perspective view of a filter system attached to a cylindrically shaped aquarium with a convex sidewall and shows the overflow box contacting the external surface of the sidewall.

Referring to FIGS. 1-3, aquariums 10 and 10' are shown. By an "aquarium" it is meant a water filled enclosure in which living fish and other aquatic animals and plants are kept. In FIG. 3, a cylindrically shaped aquarium 10' is shown having a bottom wall 12' and at least one sidewall 14' extending upward from the bottom wall 12'. The sidewall 14' is circular, curved or convex in configuration.

In FIGS. 1 and 2, the aquarium 10 is depicted as having a rectangular configuration with a front wall 16, a back wall 18 and a pair of sidewalls 14, 14 all extending upward from the bottom wall 12. Technically, the front wall 16, the back wall 18 and the pair of sidewalls 14, 14 can all be considered to be sidewalls which extend upward from the bottom wall 12. The bottom wall 12, the side walls 14, 14, the front wall 16, and the back wall 18 can be formed from a see through or transparent material such as: glass, clear plastic, a thermoplastic or Plexiglass®. By "glass" it is meant any of a large class of materials that are typically made by silicates fusing with boric oxide, aluminum, or phosphorous pentoxide. Glass is generally hard, brittle, and transparent or translucent. By "Plexiglass®" it is meant a trademark used for a light transparent weather resistant thermoplastic.

It should be noted that if the aquarium 10 had a pentagon shape, it would have five sidewalls 14. If the aquarium 10 had a hexagonal shape, it would have six sidewalls 14, etc.

Referring now to FIG. 2, the aquarium 10 has a first aperture 20 formed through the at least one of its sidewalls 14, 16 and 18. In FIG. 2, the first aperture 20 is cut in the back wall 18. The size and shape of the first aperture 20 can vary. Desirably, the first aperture 20 is circular in configuration. The diameter of the first aperture 20 can also vary. The diameter of the first aperture 20 can range from between about 0.5 inches to about 5 inches. More desirably, the diameter of the first aperture 20 can range from between about 1 inch to about 3 inches. Even more desirably, the diameter of the first aperture 20 is at least about 1.75 inches. Most desirably, the diameter of the first aperture 20 is of at least about 2 inches.

Referring again to FIGS. 1 and 2, the aquarium 10 also has a peripheral rim 22. The peripheral rim 22 extends upward from the sidewalls 14, the front wall 16 and the back wall 18. The peripheral rim 22 also projects inward and/or outward from the sidewalls 14, the front wall 16 and the back wall 18. By "rim" it is meant the border, edge or margin of an object. Normally, the peripheral rim 22 is formed from plastic, a composite material or metal. Typical metals include: aluminum, steel, etc. Plastic is commonly used to form the peripheral rim 22 in smaller size aquariums 10, such as aquariums 10 having a volume of less than 25 gallons. Metal is commonly used to form the peripheral rim 22 in larger volume aquariums, those having a volume of greater than 25 gallons. The peripheral rim 22 can extend inward and/or outward from the sidewalls 14, the front wall 16 and the back wall 18 by varying amounts depending on the overall size of the aquarium 10. For example, for a small aquarium 10, the peripheral rim 22 may extend inward and/or outward by a distance of from between about 0.1 inches to about 0.2 inches. For larger size aquariums 10, those holding 25, 30, 50, 100, 200, 300, 400, 500 or more gallons of water, the peripheral rim 22 can extend inward and/or outward by a distance of from between about 0.2 inches to about 0.75 inches. This outward projection rim 22 and its association with an overflow box 24 or 24' will be discussed in more detail below.

Referring again to FIGS. 1-3, an overflow box 24 or 24' is shown which is secured, connected, abutted or attached to the outer surface of the aquarium 10 or 10'. Each overflow box 24 and 24' is molded or formed as an integral member from a thermoplastic material or from some other material known to those skilled in the art. The overflow box 24 and 24' has no moving parts. The overflow box 24 or 24' could be positioned, abutted or be attached to any of the sidewalls 14 or 14' or back wall 18 of the aquarium 10 or 10'. In FIGS. 1 and 2, the overflow box 24 is positioned, abuttted or attached to the back wall 18. In FIG. 3, the overflow box 24' has a concave shaped front wall 28' which is designed to engage and mate with the convex sidewall 14' of the aquarium 10'. In FIG. 3, the overflow box 24' is positioned, abutted or attached to the single curved sidewall 14'.

By positioning, securing, connecting, abutting or attaching the overflow box 24 or 24' to the external or outer surface of the sidewall 14, 14' or the back wall 18, one can be assured that the overflow box 24 or 24' will be at least partially hidden from view when people are viewing the fish in the aquarium 10 or 10' from the front.

Returning to FIGS. 1 and 2, the overflow box 24 has a bottom wall 26, a front wall 28, a back wall 30, and two sidewalls 32 and 34 (see FIG. 1) secured together. The overflow box 24 is depicted as having a rectangular configuration with a height h, a width w and a thickness t. The height h, the width w and the thickness t can all vary in dimension. For an aquarium 10 having a volume of 100 gallons or more, the overflow box 24 can with a height h of at least about 9 inches, a width w of at least about 15 inches, and a thickness t of at least about 2 inches.

It should be noted that has an aquarium 10 or 10' increases in volume, the size of the overflow box 24 can also increase in size.

Figure 4:
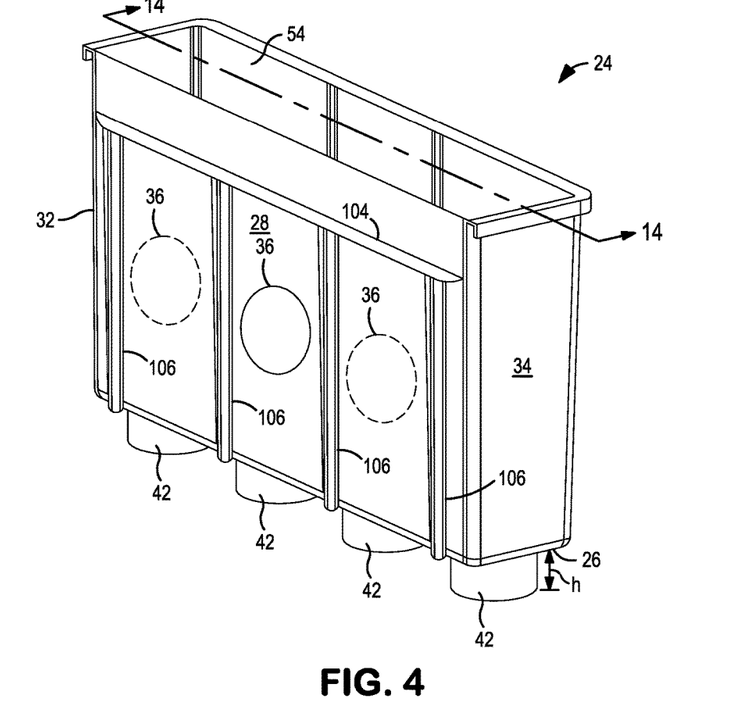
FIG. 4 is a perspective view of the overflow box showing the front wall.
Figure 5:
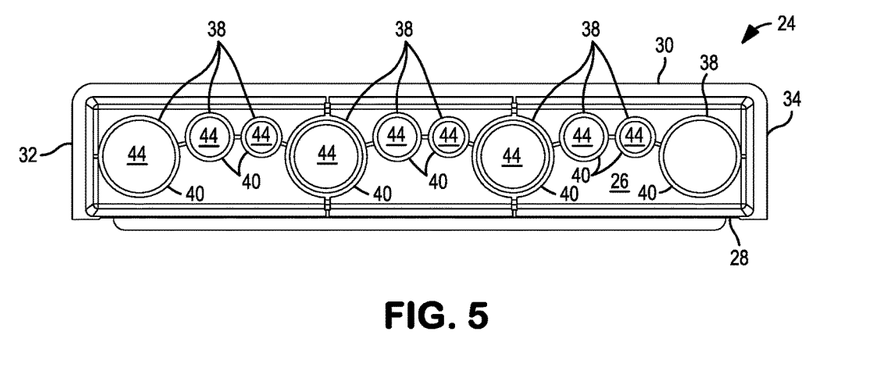
FIG. 5 is a top view of the overflow box shown in FIG. 4.
Figure 6:
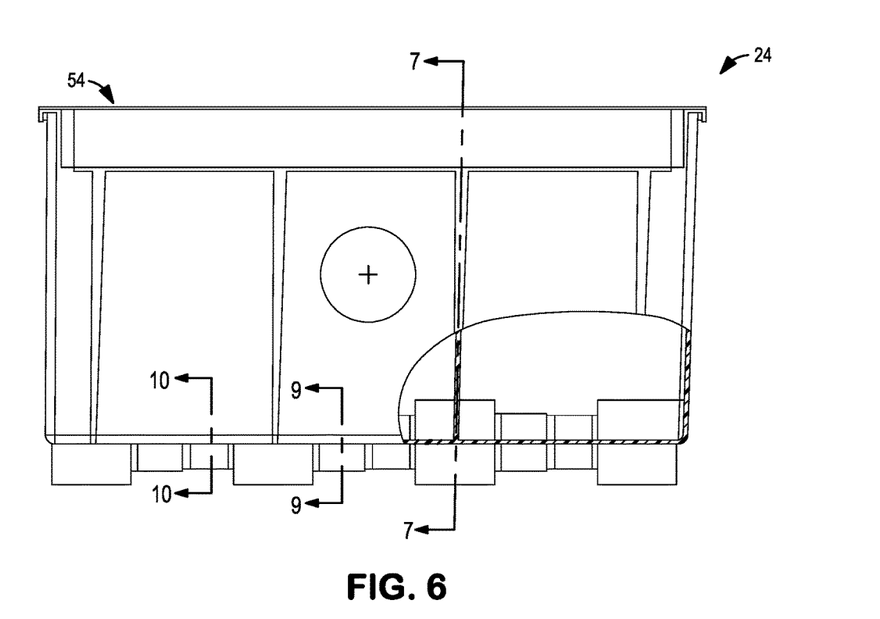
FIG. 6 is a front view of the overflow box showing the plurality of slip fittings, a horizontal rib and at least two vertically aligned ribs.
Figure 7:
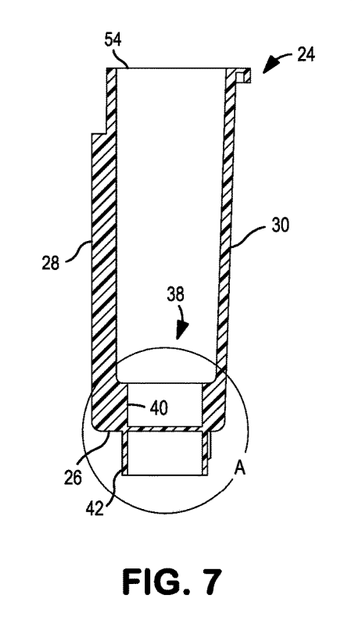
FIG. 7 is a sectional view of the overflow box taken along line 7-7 of FIG. 6.

Referring now to FIGS. 4 and 5, the front wall 28 of the overflow box 24 has a first opening 36 formed therethrough. The first opening 36 can vary in size and shape. Desirably, the first opening 36 is circular and has a diameter which is equal to or approximately equal to the diameter of the first aperture 20. Additional openings 36, 36 could be formed in the front wall 28 is desired. The additional openings 36, 36 could be of the same size and shape as the first opening 36 or be of a different size and shape. In FIG. 4, the location of two additional first openings 36, 36 are indicated by dotted lines.

It should be understood that one or more additional openings 36 could be formed almost anywhere within the front wall 28, back wall 30 or sidewalls 34 and 36 of the overflow box 24 or 24'.

Still referring to FIGS. 4 and 5, the front wall 28 is configured to contact the external or outer surface of the back wall 18 or one of the sidewalls 14 or 14' of the aquarium 10 or 10' which has the first aperture 20 formed therethrough. The first opening 36 and the first aperture 20 are coaxially aligned. By "coaxially aligned" it is meant having or mounted on a common axis.

Referring again to FIG. 3, the overflow box 24' has a bottom wall 26', a front wall 28', a back wall 30', and two sidewalls 32' and 34' secured together. The front wall 28' is concave, curved or arcuate in configuration so as to mate with the outer convex curvature of the cylindrically shaped sidewall 14' of the aquarium 10'. In addition, the back wall 30' is also curved or arcuate in configuration, although it does not have to be. A first opening 36 (not shown) is formed through the sidewall 14'. The concave front wall 28' is configured to contact the convex sidewall 14' of the aquarium 10' such that the first aperture 20 formed through the sidewall 14' is coaxially aligned with the first opening 36 formed through the overflow box 24'.

Referring again to FIGS. 4 and 5, the bottom wall 26 of the overflow box 24 has a plurality of slip fittings 38 formed therein. By "slip fitting" it is meant a circular fitting capable of receiving a riser or a hollow tube or hose. The plurality of slip fittings 38 can vary in internal diameter. Some of the slip fittings 38 can have a large internal diameter, some of the slip fittings 38 can have a medium internal diameter and some of the slip fittings 38 can have a small internal diameter. Slip fittings 38 having three different internal diameters are depicted in FIG. 5. Typically, the slip fittings 38 are sized 1.5 inches, 0.75 inches and 0.5 inches. These sizes correspond to commercially available hollow tubes or hoses. These sizes also correspond to commercially available fittings, such as: couplers, reducers, barbed elbows, barbed couplers and PVC piping.

Each of the slip fittings 38 includes a first hollow ring 40 which extends upward from the bottom wall 26 into the overflow box 24 and a second hollow ring 42 which extends downward from the bottom wall 26 away from the overflow box 24. Each of the first hollow rings 40 has a height $h_1$, and each of the second hollow rings 42 has a height $h_2$, see FIG. 2. The heights $h_1$ and $h_2$ can vary in dimension. The height $h_1$ of each of the first hollow rings 40 will normally increase as the internal diameter of each of the first hollow rings 40 increases. Likewise, the height $h_2$ of each of the second hollow rings 42 will normally increase as the internal diameter of each of the second hollow rings 42 increases. The slip fittings 38 having a large diameter will generally also have a greater height $h_1$ and $h_2$. The height $h_1$ does not have to match the height $h_2$ for a particular slip fitting 38. Alternatively, one may construct a particular slip fitting 38 such that its height $h_1$ is equal to its height $h_2$. The heights $h_1$ and $h_2$ can range from between about 0.1 inches to about 2 inches. Desirably, the heights $h_1$ and $h_2$ can range from between about 0.15 inches to about 1.5 inches. More desirably, the heights $h_1$ and $h_2$ can range from between about 0.02 inches to about 1.25 inch. Even more desirably, the heights $h_1$ and $h_2$ can range from between about 0.025 inches to about 1 inch.

Referring to FIG. 5, the plurality of slip fittings 38 are of at least three different sizes. As shown, four of the slip fittings 38 have a large diameter, three of the slip fittings 38 have a medium diameter, and three of the slip fittings 38 have a small diameter. However, the arrangement between the at least three sizes can vary. It is also possible to utilize four or more different size slip fittings 38, if desired.

Figure 8:
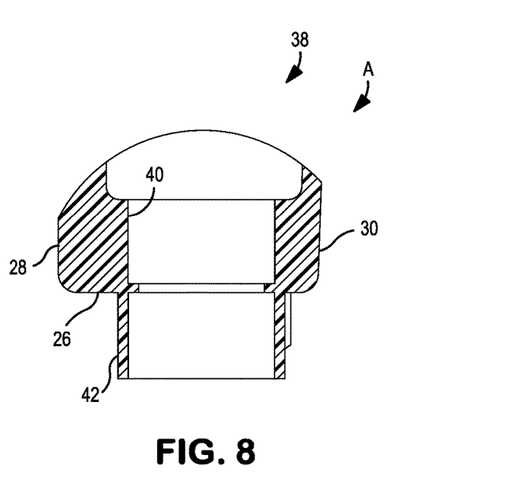
FIG. 8 is an enlarged view of the bottom end of the overflow box labeled as section A.
Figure 9:
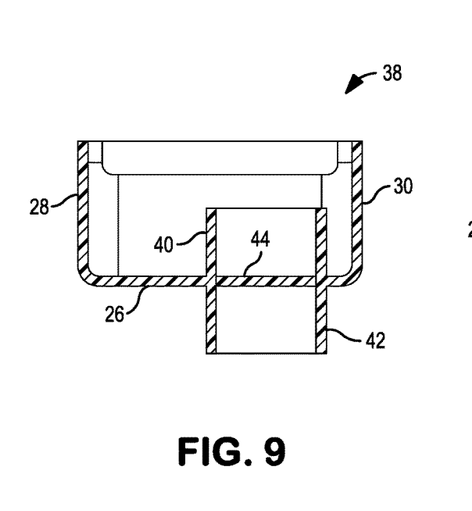
FIG. 9 is a sectional view of the medium diameter slip fitting taken along line 9-9 of FIG. 6.
Figure 10:
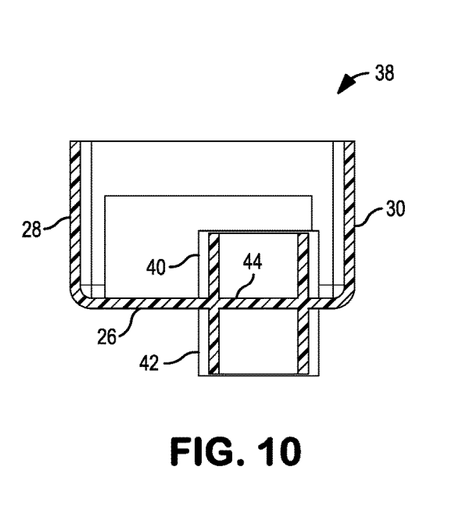
FIG. 10 is a sectional view of the small diameter slip fitting taken along line 10-10 of FIG. 6.

Referring now to FIGS. 4-10, the overflow box 24 is shown along with cross-sectional view of the three different size slip fittings 38, 38 and 38. One of the slip fittings 38 is open to water flow while the remaining slip fittings 38 are initially closed to water flow by a thin wall 44. In FIG. 5, the right most slip fitting 38 is open to water flow and does not have a thin wall 44. FIG. 8 shows the thin wall 44 removed from one of the large diameter slip fittings 38. The thin wall 44 is present in FIGS. 9 and 10. In these figures, the medium and small diameter slip fittings 38, 38 are shown. The thin wall 44 can vary in thickness. Desirably, the thin wall 44 is less than 0.2 inches thick. More desirably, the thin wall 44 is less than 0.15 inches thick. Even more desirably, the thin wall 44 is less than 0.1 inches thick. The thin wall 44 can be constructed of the same material used to construct the slip fitting 38 or it can be constructed of a different material. Desirably, the slip fitting 38 is formed from plastic and the thin wall 44 can be drilled out, punched out, or be removed in some other fashion, to open the slip fitting 38 to water flow therethrough. The thin wall 44 of any of the remaining slip fittings 38 can be drill out or removed to create a passageway open to water flow. The remaining slip fittings 38 allow the owner of the aquarium 10 or 10' to attach additional drains. In addition, the additional slip fittings 38 allow the owner of the aquarium 10 or 10' to attach additional devices or equipment, including but not limited to: a secondary filtration device, a protein skimmer, a return pump, a UV sanitizer, a refugium, a secondary filter, etc. Many aquarium owners like to customize their aquariums 10 or 10' an add water heaters, water coolers, water temperature control equipment, etc. The different size slip fittings 38 allow for such specialized equipment to be added, as desired.

Referring again to FIGS. 1-3, a drain tube 45 having a first end 46 and a second end 47 connects the overflow box 24 or 24' to a filter 48. The first end 46 is connected to the slip fitting 38 and the second end 47 is connected to a filter 48. The slip fitting 38 is open to water flow. The drain tube 45 has an external or outer diameter approximately equal to or slightly less than the interior diameter of the slip fitting 38.

This structure allows the drain tube 45 to be inserted into one of the slip fittings 38. The drain tube 45 functions to route waste water from the overflow box 24 or 24' to the filter 48. The connection between the second hollow ring 42 and the drain tube 45 establishes a snug or an interference fit. A sealing material, such as: an adhesive, glue, a co-adhesive, a sealant, etc. can also be applied to the connection to ensure a water tight seal. One of the benefits of using a slip fitting 38 is that the drain tube 45 could be removed and be replaced by another drain tube 45. Alternatively, the slip fitting 38 could be plugged with a stopper (not shown), if desired.

The drain tube 45 could be formed from various materials. Common materials from which the drain tube 45 can be formed include, but are not limited to: plastics, thermoplastics, polyvinyl chloride (PVC), etc. A flexible drain tube 45 could be constructed from a soft plastic, rubber, etc. The drain tube 45 is usually connected to one of the large diameter slip fittings 38. This assures that the circulation of waste water from the overflow box 24 or 24' occurs at an appropriate volume. The drain tube 45 connects to the filter 48.

The filter 48 can be externally located away from the aquarium 10 or 10'. The filter 48 can vary in construction and operation. Many different kinds and types of filters are commercially available and are well known to those skilled in the art. U.S. Pat. No. 9,409,804 B1 issued Aug. 9, 2016 and entitled: "FILTER SYSTEM FOR A FLUID" teaches one such filter which could be used with the present invention. Normally, a filter 48 uses one or more screens to filter out sediment and/or debris, a bacterial filter to treat the waste water, and one or more settling chambers to remove suspended matter. The waste water entering the filter 48 is treated to produce clean water. This clean water is then routed back to the aquarium 10 or 10' by a pump 50. The pump 50 can vary in construction and design. Many different sizes and kinds of water pumps are commercially available and are well known to those skilled in the art. The pump 50 is associated with the filter 48. Generally, the pump 50 is positioned in the last chamber of the filter 48 and has a return line 52 for returning the clean water back to the aquarium 10 or 10'. The return line 52 can be a hollow tube or hose made from various materials, including but not limited to: plastic, a thermoplastic, PVC, rubber, or any other material known to those skilled in the art.

Figure 11:
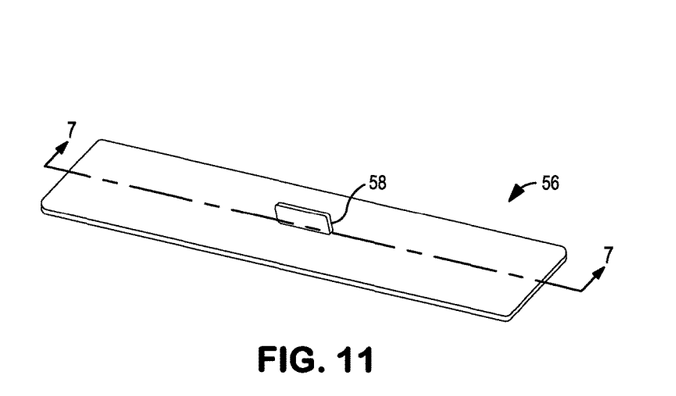
FIG. 11 is a perspective view of a removable cover with a handle.
Figure 12:
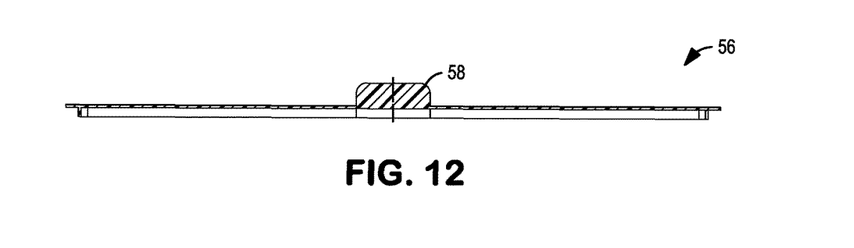
FIG. 12 is a vertical sectional view of the removable cover taken along line 12-12 of FIG. 11.

Referring now to FIGS. 1, 11 and 12, the overflow box 24 is shown having an open top 54. The open top 54 can be closed by a removable cover 56. The removable cover 56 can vary in size, shape and construction. The removable cover 56 can be formed from a variety of material. Typically, the removable cover 56 is made of: plastic, clear plastic, glass or Plexiglass®. The removable cover 56 can include a handle 58 to assist in positioning and removing the cover 56. The handle 58 can vary in size, shape and construction. The handle 58 can be formed from a variety of material including but not limited to: plastic, clear plastic, wood, metal, aluminum, Plexiglass®, or any other material known to those skilled in the art.

The removable cover 56 can close the open top 54 of the overflow box 24 or 24' and serves to quiet any noise that may occur as the waste water passes into the overflow box 24 or 24' from the aquarium 10 or 10'. The removable cover 56 can also quiet any noise that may occur as the waste water enters the drain tube 45 from the overflow box 24 or 24'. The removable cover 56 also functions to reduce evaporation of the waste water that is retained in the overflow box 24.

Figure 13:
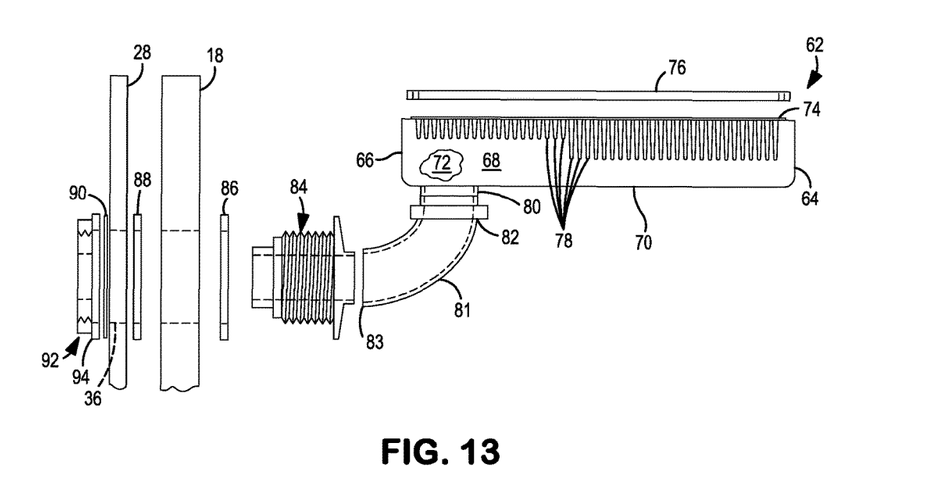
FIG. 13 is an exploded side view of an overflow device connected to an external overflow box.

Turning now to FIGS. 1, 3 and 13, the overflow box 24 or 24' is a vast improvement over any overflow box that is now commercially available in that it very quietly receives waste water from the aquarium 10 or 10'. One reason for this is that each aquarium 10 or 10' has a surface water line 60, see FIGS. 1 and 3. The surface water line 60 is the upper surface of the water retained in the aquarium 10 or 10'. In this invention, the overflow box 24 or 24' receives the waste water from the aquarium 10 or 10' below its surface water line 60 and below the first aperture 20, and directs this waste water to the filter 48.

Turning now to FIG. 13, an overflow device 62 is shown which includes a front wall 64, a back wall 66, and a pair of sidewalls 68, 68, of which only one is visible, all secured to a bottom wall 70. The front wall 64, the back wall 66 and the pair of sidewalls 68, 68 extend upward from the bottom wall 70 to create a chamber 72 having an open top 74. The open top 74 can be closed by a cover 76. The cover 76 can contain a plurality of openings formed therethrough, if desired. The front wall 64, the back wall 66 and the pair of sidewalls 68, 68 have a plurality of slots 78 formed therethrough. The plurality of slots 78 can vary in number. The plurality of slots 76 can also have different heights, as depicted.

The overflow device 62 is positioned in the aquarium 10 or 10' such that a portion of the plurality of slots 76 are disposed above the surface water line 60 of the aquarium 10 or 10' and a portion of the plurality of slots 78 are disposed below the surface water line 60 of the aquarium 10 or 10'. This location means that the overflow device 62 can receive waste water from the upper surface of the aquarium 10 or 10'.

Still referring to FIG. 13, the bottom wall 70 of the overflow device 62 has an enlarged aperture 80 formed therethrough. A connecting tube 81 having a first end 82 and a second end 83 secures the overflow device 62 to the overflow box 24. The first end 82 of the connecting tube 81 is secured to the enlarged aperture 80 of the overflow device 62 in a water tight fashion. In this position, the overflow device 62 is positioned at the surface water line 60 in the aquarium 10 such that it is capable of removing waste water from the aquarium 10. The opposite or second end 83 of the connecting tube 81 is secured to a threaded coupler 84. The threaded coupler 84 passes through a first washer 86 and through the back wall 18 of the aquarium 10. The threaded coupler 84 can then pass through a second washer 88 and through the first opening 36 formed in the front wall 28 of the overflow box 24. The threaded coupler 84 then passes through a third washer 90. A nut 92 having an enlarged shoulder 94 is threaded onto the threaded coupler 84 to create a water tight connection between the various parts. The connecting tube 81 functions to route the waste water from the aquarium 10 into the overflow box 24. A more detailed description of a similar connection is taught in U.S. Patent publication 2016/0227748 A1 dated Aug. 11, 2016 and entitled: "OVERFLOW SYSTEM FOR A TANK AND A METHOD OF AFFIXING THE OVERFLOW SYSTEM TO THE TANK". This U.S. Patent Publication is incorporated by reference and made a part hereof.

Referring once again to FIG. 3, the bottom wall 26' of the overflow box 24' would also have a plurality of slip fittings 38' formed therein. One of the slip fittings 38' is depicted. Each of these slip fittings 38' would also have a first hollow ring 42.

Figure 14:
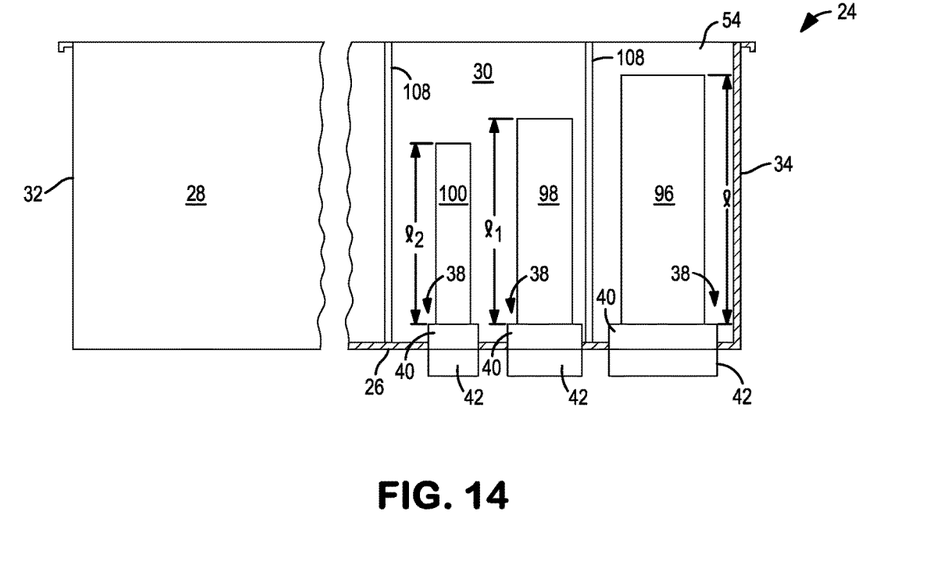
FIG. 14 is a partial cross-section view of the overflow box 24 taken along line 14-14 of FIG. 4.

Referring now to FIG. 14, the overflow box 24 is shown having a first riser 96, a second riser 98, and a third riser 100. All three risers 96, 98 and 100 are hollow tubular members. The first, second and third risers, 96, 98 and 100 respectively, can be constructed from various materials. Typically, the first, second and third risers, 96, 98 and 100 are formed from plastic, a thermoplastic, PVC, metal or some other material known to those skilled in the art. The first riser 96 is secured to the large diameter slip fitting 38 and extends upward from the inner diameter of the first hollow ring 40. The first riser 96 is sealed in a water tight fashion to the inner diameter of the large diameter slip fitting 38. The second riser 98 is secured to the medium diameter slip fitting 38 and extends upward from the inner diameter of the first hollow ring 40. The second riser 98 is sealed in a water tight fashion to the inner diameter of the medium diameter slip fitting 38. The third riser 100 is secured to the small diameter slip fitting 38 and extends upward from the inner diameter of the first hollow ring 40. The third riser 100 is sealed in a water tight fashion to the inner diameter of the small diameter slip fitting 38.

The first riser 96 extends upward toward the open top 54 of the overflow box 24. The first riser 96 has a length which can vary in dimension. Because the open top 54 of the overflow box 24 is aligned flush with the peripheral rim 22 of the aquarium 10, see FIG. 2, when the threaded coupler 84 is secured by the nut 92, the first riser 96 can extend upward and terminate very close to the open top 54. This design is advantageous in that it allows the first riser 96 to extend higher in the overflow box 24. This construction provides more options to eliminate noise because an upper water line 102 in the overflow box 24 can be higher than the first aperture 20 drilled in the back wall 18 or sidewall 14 or 14' of the aquarium 10 or 10'. Not only is the noise level reduced but this design does away with an unsightly surface water line 60 being visible below the lower edge of the peripheral rim 22 of the aquarium 10. By keeping the surface water line 60 in the aquarium 10 above the lower edge of the peripheral rim 22, a person looking at the fish in the aquarium 10 will not be able to see the surface water line 60.

It should be understood that the first riser 96, and the large diameter slip fitting 38 it is connected to, is open to water flow.

Still referring to FIG. 14, the second riser 98 has a length $l_2$ which can vary in dimension. Because the open top 54 of the overflow box 24 is aligned flush with the peripheral rim 22 of the aquarium 10, see FIG. 2, when the threaded coupler 84 is secured by the nut 92, the second riser 98 can extend upward and terminate very close to the open top 54. This design is advantageous in that it allows the second riser 98 to extend higher in the overflow box 24. This construction provides more options to eliminate noise because the upper water line 102 in the overflow box 24 can be higher than the first aperture 20 drilled in the back wall 18 of the aquarium 10. Not only is the noise level reduced but this design does away with an unsightly surface water line 60 being visible below the lower edge of the peripheral rim 22 of the aquarium 10. By keeping the surface water line 60 in the aquarium 10 above the lower edge of the peripheral rim 22, a person looking at the fish in the aquarium 10 will not be able to see the surface water line 60.

It should be understood that the second riser 98, and the medium diameter slip fitting 38 it is connected to, is open to water flow. In this case the thin wall 44 was removed by drilling it out or by some other means known to those skilled in the art.

The third riser 100 has a length $l_3$ which can vary in dimension. Because the open top 54 of the overflow box 24 is aligned flush with the peripheral rim 22 of the aquarium 10, see FIG. 2, when the threaded coupler 84 is secured by the nut 92, the third riser 100 can extend upward and terminate very close to the open top 54. This design is advantageous in that it allows the third riser 100 to extend higher in the overflow box 24. This construction provides more options to eliminate noise because the upper water line 102 in the overflow box 24 can be higher than the first aperture 20 drilled in the back wall 18 of the aquarium 10. Not only is the noise level reduced but this design does away with an unsightly surface water line 60 being visible below the lower edge of the peripheral rim 22 of the aquarium 10. By keeping the surface water line 60 in the aquarium 10 above the lower edge of the peripheral rim 22, a person looking at the fish in the aquarium 10 will not be able to see the surface water line 60.

It should be understood that the third riser 100, and the small diameter slip fitting 38 it is connected to, is open to water flow. In this case the thin wall 44 was removed by drilling it out or by some other means known to those skilled in the art.

Referring again to FIG. 4, the front wall 28 of the overflow box 24 has a horizontally aligned and outwardly extending rib 104. The horizontal rib 104 is positioned at least about 1 inch down from the open top 54. Desirably, the horizontal rib 104 will be positioned at a distance that is slightly greater than the height of the peripheral rim 22. The horizontal rib 104 allows the peripheral rim 22 of the aquarium 10 or 10' to be positioned above the horizontal rib 104 such that the open top 54 of the overflow box 24 is aligned flush with the peripheral rim 22 of the aquarium 10 or 10'.

In addition to the horizontal rib 104, at least two vertically aligned and outwardly extending ribs 106, 106 are also present on the front wall 28 of the overflow box 24. In FIG. 4, four vertical ribs 106, 106, 106 and 106 are shown. The at least two vertically aligned ribs 106, 106 abut the horizontal rib 104. If desired, the at least two vertical ribs 106, 106 can be spaced apart from the horizontal rib 104. Likewise, the at least two vertically aligned ribs 106, 106 can be slightly angled, if desired. At least one of the at least one two vertically aligned ribs 106, 106 is located on one side of the first opening 36, and at least one of the at least two vertically aligned ribs 106, 106 is located on the opposite side of the first opening 36. The horizontal rib 104 and the at least two vertically aligned ribs 106, 106 function to contact and abut the exterior or outer surface of the back wall 18 or the sidewall 14 or 14' of the aquarium 10 or 10' and assist in holding the overflow box 24 upright.

Referring again to FIG. 14, one will notice that the inside surface of the front wall 30 of the overflow box 24 contains at least two spaced apart ribs 108, 108. The at least two ribs 108, 108 are vertically aligned relative to the bottom wall 26. The at least two ribs 108, 108 add structure to the overflow box 24. If the wall thickness of the overflow box 24 is increased, the ribs 108, 108 may not be needed.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An overflow box positioned externally to and secured to an aquarium, said aquarium having a bottom wall, at least one sidewall extending upward from said bottom wall, and a first aperture formed through said at least one sidewall, said overflow box comprising: a bottom wall, a front wall, a back wall and two sidewalls secured together, said front wall having a first opening formed therethrough and said front wall configured to contact said sidewall of said aquarium having said first aperture formed therethrough, said first opening and said first aperture being coaxially aligned, said bottom wall of said overflow box having a plurality of slip fittings formed therein, each of said slip fittings includes a first hollow ring extending upward from said bottom wall into said overflow box and a second hollow ring extending downward from said bottom wall away from said overflow box, said plurality of slip fittings being of at least three different sizes, one of said slip fittings being open to water flow while said remaining slip fittings are initially closed to water flow by a thin wall, and said overflow box receives waste water from said aquarium, below its water line, and directs said waste water to a filter.

2. The overflow box of claim 1 wherein said overflow box is molded from a thermoplastic material, and said at least three different size slip fittings include a large diameter slip fitting, a medium diameter slip fitting, and a small diameter slip fitting.

3. The overflow box of claim 2 further comprising a first hollow tubular riser secured to said large diameter slip fitting, said riser extending upward toward said open top of said overflow box, and said large diameter slip fitting being open to water flow.

4. The overflow box of claim 3 further comprising a second hollow tubular riser secured to one of said remaining slip fittings, and said thin wall of said slip fitting having said second riser secured to it having been removed so as to be open to water flow.

5. The overflow box of claim 4 further comprising a third hollow tubular riser secured to one of said remaining slip fittings, and said thin wall of said slip fitting having said third riser secured to it having been removed so as to be open to water flow.

6. The overflow box of claim 1 wherein said overflow box is molded as an integral member from a thermoplastic material and has no moving parts.

7. A filter system for an aquarium having a bottom wall and at least one sidewall extending upward from said bottom wall, a first aperture formed through said at least one sidewall, and a peripheral rim, said aquarium capable of holding a quantity of water and having a surface water line, said filter system comprising:
  a) an overflow box having a bottom wall, a front wall, a back wall and two sidewalls secured together, said front wall having a first opening formed therethrough and said front wall configured to externally contact said at least one sidewall of said aquarium having said first aperture formed therethrough, said first opening and said first aperture being coaxially aligned, said bottom wall having a plurality of slip fittings formed therein, said slip fittings being of at least three different sizes, one of said slip fittings being open to water flow while said remaining slip fittings are initially closed to water flow by a thin wall, and said overflow box having an open top;
  b) a connecting tube having a first end and a second end, said first end is secured to an overflow device positioned at said surface water line in said aquarium, and said second end is secured to a coupling in a water tight fashion, said coupling passing through said first aperture and through said first opening, said overflow device is capable of removing waste water from said aquarium and said connecting tube and coupler route said waste water from said overflow device into said overflow box, and said open top of said overflow box being aligned flush with said peripheral rim of said aquarium when said coupling is secured;
  c) a drain tube having a first end connected to said slip fitting, which is open to water flow, and having a second end connected to a filter, said filter capable of filtering said waste water to produce clean water; and
  d) a pump associated with said filter, said pump returning said clean water through a return line back into said aquarium.

8. The overflow box of claim 7 wherein each of said slip fittings includes a first hollow ring extending upward from said bottom wall into said overflow box and a second hollow ring extending downward from said bottom wall away from said overflow box.

9. The overflow box of claim 7 wherein said three different size slip fittings include a large diameter slip fitting with a diameter of about 1.5 inches, a medium diameter slip fitting with a diameter of about 0.75 inches, and a small diameter slip fitting with a diameter of about 0.5 inches.

10. The overflow box of claim 7 wherein said overflow box is molded as an integral member from a thermoplastic material and has no moving parts.

11. The overflow box of claim 7 further comprising four large diameter slip fittings, three medium diameter slip fittings and three small diameter slip fittings.

12. The overflow box of claim 7 wherein said thin wall of said remaining slip fittings can be drill out to create a passageway open to water flow.

13. The overflow box of claim 7 further comprising a removable cover which can close said open top of said overflow box, and said removable cover has a handle.

14. The overflow box of claim 7 wherein said at least one sidewall of said aquarium is convex and said front wall of said overflow box is concave, and said convex sidewall mates with said concave front wall.

15. The overflow box of claim 14 wherein said three different size slip fittings include a large diameter slip fitting with a diameter of about 1.5 inches, a medium diameter slip fitting with a diameter of about 0.75 inches, and a small diameter slip fitting with a diameter of about 0.5 inches.

16. The overflow box of claim 7 wherein said front wall has a horizontally aligned outwardly extending rib positioned at least about 1 inch down from said open top, said rib allowing said peripheral rim of said overflow box to be positioned above said rib such that said open top of said overflow box is aligned flush with said peripheral rim of said aquarium.

17. The overflow box of claim 16 further comprising at least two vertically aligned, outwardly extending ribs which abut said horizontal rib, at least one of said at least two vertically aligned ribs being located on one side of said first opening, and said at least two vertically aligned ribs contacting said at least one sidewall of said aquarium.

18. The overflow box of claim 17 further comprising a rectangular, vertical cross-sectional configuration having a height of at least about 9 inches, a width of at least about 15 inches, and a thickness of at least about 2 inches.

19. A filter system for an aquarium having a bottom wall and at least one sidewall extending upward from said bottom wall, a first aperture formed through said at least one sidewall, and a peripheral rim, said aquarium capable of holding a quantity of water and having a surface water line, said filter system comprising:
  a) an overflow box having a bottom wall, a front wall, a back wall and two sidewalls secured together, said front wall having a first opening formed therethrough and said front wall configured to externally contact said at least one sidewall of said aquarium having said first aperture formed therethrough, said first opening and said first aperture being coaxially aligned, said bottom wall having a plurality of slip fittings formed therein, each of said slip fittings includes a first hollow ring extending upward from said bottom wall into said overflow box and a second hollow ring extending downward from said bottom wall away from said overflow box, said slip fittings being of at least three different sizes, one of said slip fittings being open to water flow while said remaining slip fittings are initially closed to water flow by a thin wall, and said overflow box having an open top;

b) a connecting tube having a first end and a second end, said first end is secured to an overflow device positioned at said surface water line in said aquarium, and said second end is secured to a coupling in a water tight fashion, said coupling passing through said first aperture and through said first opening, said overflow device is capable of removing waste water from said aquarium and said connecting tube and coupler route said waste water from said overflow device into said overflow box, and said open top of said overflow box being aligned flush with said peripheral rim of said aquarium when said coupling is secured;

c) a drain tube having a first end connected to said slip fitting, which is open to water flow, and having a second end connected to a filter, said filter capable of filtering said waste water to produce clean water; and d) a pump associated with said filter, said pump returning said clean water through a return line back into said aquarium.

20. The filter system of claim 16 wherein said overflow device comprises a front wall, a back wall, and a pair of sidewalls all secured to a bottom wall and extending upward therefrom to create a chamber having an open top, said front wall, back wall and said pair of sidewalls having a plurality of slots formed therethrough, said overflow device positioned in said aquarium with a portion of said plurality of slots disposed below said surface water line of said aquarium so as to receive waste water from said aquarium into said chamber, and said bottom wall having an enlarged aperture formed therethrough.

* * * * *